US012585520B1

(12) United States Patent
Lu et al.

(10) Patent No.: US 12,585,520 B1
(45) Date of Patent: Mar. 24, 2026

(54) IDENTIFYING DOUBLE WRITE ERRORS IN DATABASES

(71) Applicant: Zoom Video Communications, Inc., San Jose, CA (US)

(72) Inventors: Liang Lu, Hangzhou (CN); Jianqiu Pan, Hangzhou (CN); Xiaoyan Sun, Suzhou (CN); Qing Wang, Hangzhou (CN); Yufan Zeng, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 112 days.

(21) Appl. No.: 18/242,306

(22) Filed: Sep. 5, 2023

(51) Int. Cl.
*G06F 11/07* (2006.01)

(52) U.S. Cl.
CPC ...... *G06F 11/0772* (2013.01); *G06F 11/0757* (2013.01); *G06F 11/0778* (2013.01)

(58) Field of Classification Search
CPC ............. G06F 11/0772; G06F 11/0757; G06F 11/0778
See application file for complete search history.

(56) References Cited

U.S. PATENT DOCUMENTS

| | | | | | |
|---|---|---|---|---|---|
| 8,121,978 | B2 * | 2/2012 | Wiss | ................... | G06F 11/2071 |
| | | | | | 707/634 |
| 11,120,047 | B1 * | 9/2021 | Hoffmann | ............. | G06F 16/273 |
| 2017/0123889 | A1 * | 5/2017 | Haridas | ................... | G06F 16/11 |
| 2017/0286518 | A1 * | 10/2017 | Horowitz | ............ | G06F 16/2365 |
| 2019/0235941 | A1 * | 8/2019 | Bath | ..................... | G06F 11/079 |
| 2021/0049154 | A1 * | 2/2021 | Forghani | ............. | G06F 16/2255 |

FOREIGN PATENT DOCUMENTS

CN            107577780 A   *   1/2018

OTHER PUBLICATIONS

MySQL Binary Log (IBM Stream Sets, Data Collector Engine Guide, 2021) https://docs.streamsets.com/platform-datacollector/latest/datacollector/UserGuide/Origins/MySQLBinaryLog.html (Year: 2021).*

(Continued)

*Primary Examiner* — Michael Maskulinski
*Assistant Examiner* — Kayo Lisa Rusin
(74) *Attorney, Agent, or Firm* — Kilpatrick Townsend & Stockton, LLP

(57) ABSTRACT

Techniques for database double write monitoring are provided. In an example method, a computing device receives a first indication of a first database write to a first database and a second indication of a second database write to a second database. The computing device determines a time interval between the first database write and the second database write and responsive to the time interval being less than a predefined threshold time interval, determining a difference between the first database write and the second database write based on a comparison of first information about the first database write and second information about the second database write. The computing device generates a double write error comprising the first and second information. The computing device generates a notification comprising third information about the double write error outputs the notification to cause a correction of the double write error.

20 Claims, 8 Drawing Sheets

(56) References Cited

OTHER PUBLICATIONS

Sharma, Aman (Oracle System Change Number, An Introduction, Red Gate Software Ltd, May 23, 2016) https://www.red-gate.com/simple-talk/databases/oracle-databases/oracle-system-change-number-an-introduction/ (Year: 2016).*

Wikipedia, The Free Encyclopedia (Serialization, May 30, 2023) https://en.wikipedia.org/w/index.php?title=Serialization&oldid=1157686972 (Year: 2023).*

Translations for CN-107577780-A by PE2E on Jul. 2025. (Year: 2025).*

* cited by examiner

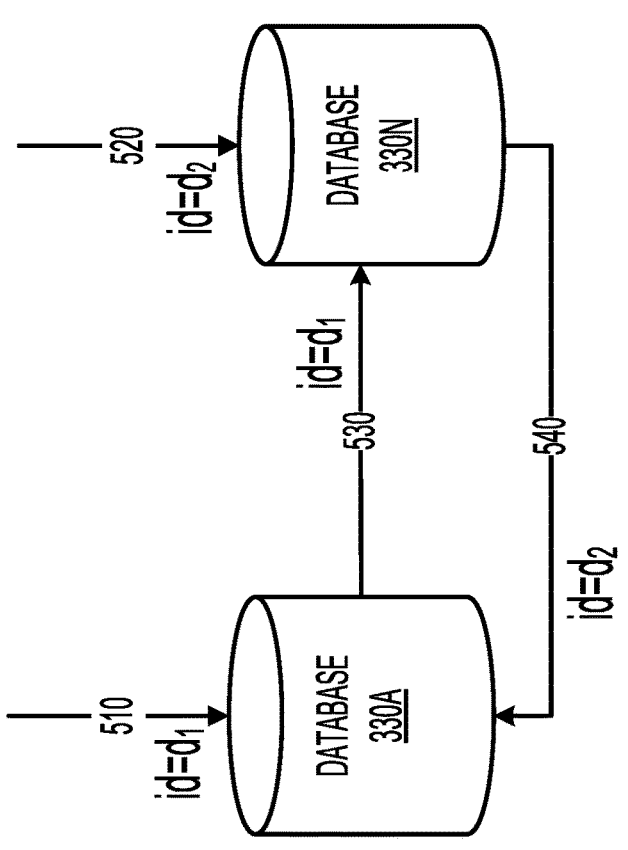
*FIG. 5*

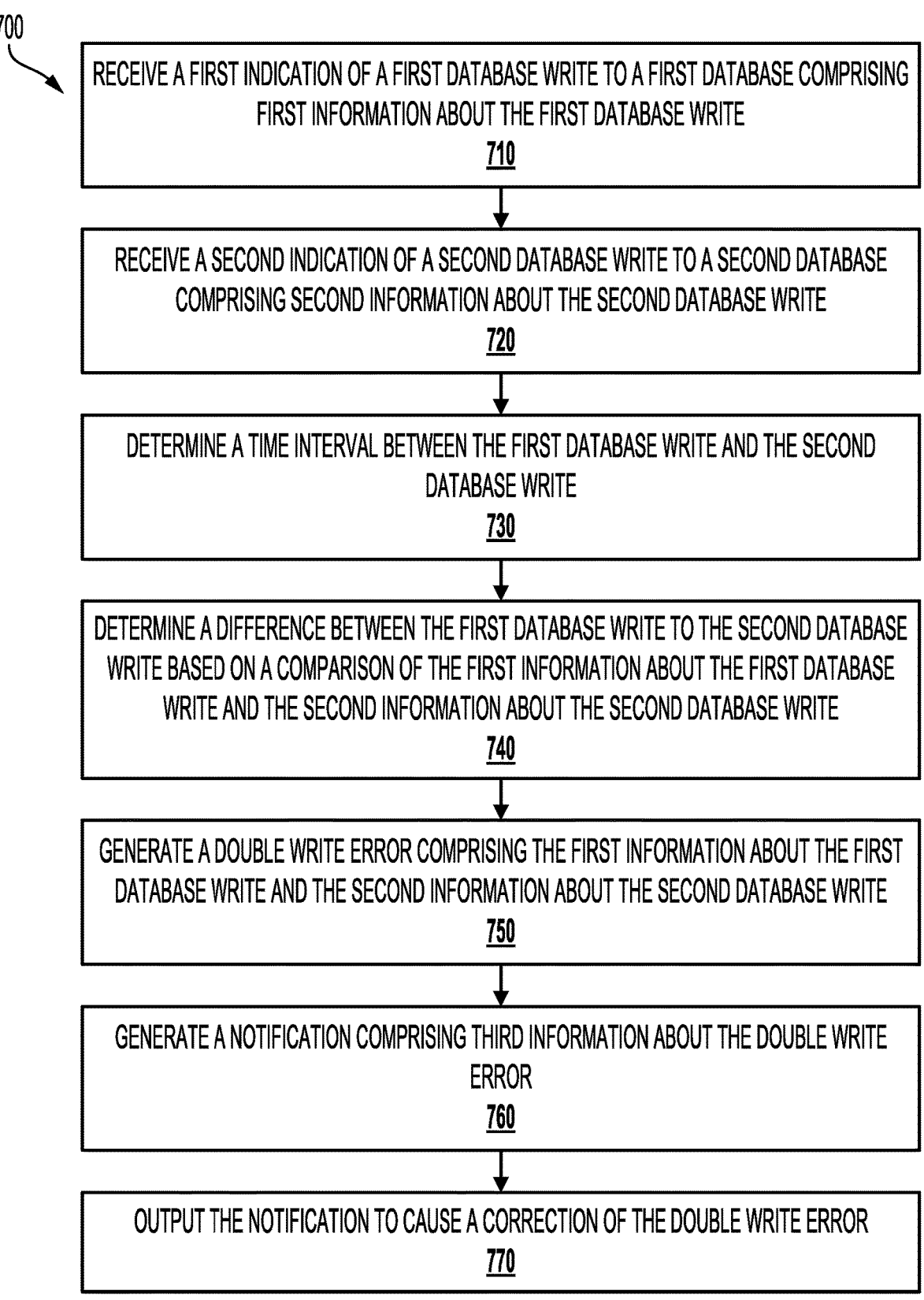

700

RECEIVE A FIRST INDICATION OF A FIRST DATABASE WRITE TO A FIRST DATABASE COMPRISING FIRST INFORMATION ABOUT THE FIRST DATABASE WRITE
710

RECEIVE A SECOND INDICATION OF A SECOND DATABASE WRITE TO A SECOND DATABASE COMPRISING SECOND INFORMATION ABOUT THE SECOND DATABASE WRITE
720

DETERMINE A TIME INTERVAL BETWEEN THE FIRST DATABASE WRITE AND THE SECOND DATABASE WRITE
730

DETERMINE A DIFFERENCE BETWEEN THE FIRST DATABASE WRITE TO THE SECOND DATABASE WRITE BASED ON A COMPARISON OF THE FIRST INFORMATION ABOUT THE FIRST DATABASE WRITE AND THE SECOND INFORMATION ABOUT THE SECOND DATABASE WRITE
740

GENERATE A DOUBLE WRITE ERROR COMPRISING THE FIRST INFORMATION ABOUT THE FIRST DATABASE WRITE AND THE SECOND INFORMATION ABOUT THE SECOND DATABASE WRITE
750

GENERATE A NOTIFICATION COMPRISING THIRD INFORMATION ABOUT THE DOUBLE WRITE ERROR
760

OUTPUT THE NOTIFICATION TO CAUSE A CORRECTION OF THE DOUBLE WRITE ERROR
770

*FIG. 7*

IDENTIFYING DOUBLE WRITE ERRORS IN DATABASES

FIELD

The present application generally relates to database administration, and more particularly relates to techniques for database double write monitoring.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 5 shows an example of a system illustrating several circumstances under which a database double write error may occur, according to some aspects of the present disclosure.

FIG. 7 shows a flowchart of an example method for database double write monitoring, according to some aspects of the present disclosure.

DETAILED DESCRIPTION

Figure 1:
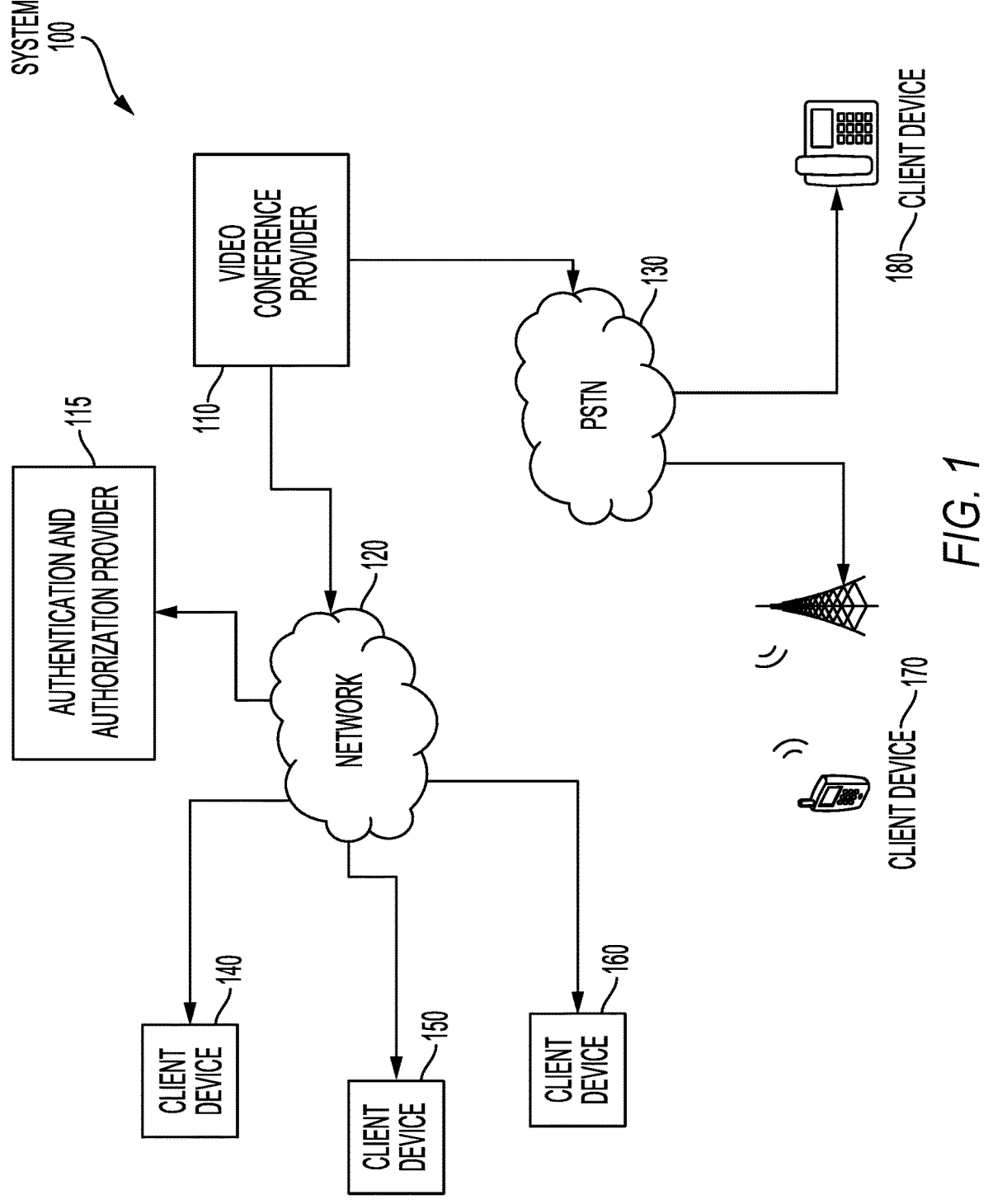
FIG. 1 shows an example system that provides videoconferencing functionality to various client devices.

Examples are described herein in the context of techniques for database double write monitoring. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing is a key component of internationalized personal and enterprise communications, possible because of the widespread availability of reliable, broadband network connections. But as video conferencing continues to enable more and more remote workflows, the complexity of the backend systems that support such high-bandwidth telecommunications grows in parallel. With increased complexity comes increased risk for service unavailability due to network or server failures.

Web application backend systems are accordingly configured for high availability (HA), in which various software and hardware redundancies are used to ensure continuity of service even in the face of catastrophic network or server failures. For example, an HA web application may be implemented by way of a geographically distributed "cluster" of computing resources. The cluster can be configured with several nodes such that a complete loss of one node does not impact the functioning of the remaining nodes. In this context, a node refers to one or more server resources collectively accessible over a network, like the Internet.

Such clusters can be operated in various modes depending on the particular needs of a given application. For example, an HA cluster can be operated in active-passive mode. In active-passive mode, one or more nodes are active, while the others are on standby. In standby, a node is configured to quickly become active. If an active node fails, a passive node is caused to assume the load of the failed active node manually or automatically.

Another possible configuration of an HA cluster or application is the active-active mode. In active-active mode, all nodes in the cluster are active and share the network workload approximately equally. In this configuration, if one node fails, the remaining nodes can continue to handle the increased load. Any number of nodes can be active in this mode. For example, some configurations may be in an active-active-active mode with three active nodes handling network requests simultaneously. Many other HA cluster configurations are also possible.

In some HA configurations, each node may maintain an independent copy of certain data stores, like databases that store web application operational information. Because web application users expect equivalent functionality regardless of which node their network requests are directed to, maintaining such databases in synchronization is an important part of administrating HA clusters in this configuration.

For example, consider a web application that provides a service offered by a video conference provider, like an application programming interface (API) used by video conferencing software clients. If the video conference provider operates the web application in an active-active-active HA cluster with three active nodes, video conference participants may connect to a video conference using various client devices that connect to the API provided by the video conference provider from disparate global locations. The network requests associated with video conference participation may be routed to any of the active nodes depending on the status of the load balancer, the physical location of the participants, the state of the network, and other factors.

Nevertheless, the video conference participants expect a user experience in which there is no apparent difference in experience depending on which active node their client device happens to connect to. Indeed, users are typically both unaware of and uninterested in such details. Therefore, any data associated with an ongoing video conference stored in a database must be synchronized among the databases corresponding to the active nodes with a very low latency (e.g., faster than a participant can notice any discrepancies).

To this end, HA clusters may include replication mechanisms to maintain databases synchronized during normal operations. In some examples, one node accepts write operations and replicates the changes to one or more other nodes. The replication can be synchronous, in which the first node waits for acknowledgment from the other nodes before confirming a write, or asynchronous, in which the first node continues operations without waiting for confirmation. Synchronous replication mechanisms may operate as soon as database writes occur or may cause replication periodically, within some predetermined time interval (e.g., every second). In some examples, replication may occur once a certain number of writes occur or once a time interval has expired, whichever occurs first.

However, HA clusters with replication mechanisms in places may still be vulnerable to consistency errors in systems where consistency among cluster nodes is required at all times. For example, during a video conference, redundant databases may be used at each active node that are storing information relating to a real-time video conference like real-time chat dialogue, reactions, or user profile data.

Consider a participant in a video conference using a chat function. If the participant transmits a chat message and then very quickly edits it, the initial message may go to an eastern node and the edited message may go to a western node. Both nodes may be configured to write the message to a database that is mirrored between the two nodes using a replication mechanism.

In this example, at $t_1$, the initial chat message is written to the eastern node first. At $t_2$, the replication mechanism on the eastern node transmits the persisted initial chat message to the western node. At $t_3$, the edited message arrives at the western node. At $t_4$, the edited message is persisted on the database instance hosted at the western node. Finally, at $t_5$, the replication message from the eastern node arrives at the western node and is written, overwriting the edited message with the initial message. Thus, the initial message is persisted on both the eastern and western node databases where the edited message should be. This state of affairs is a simple example of a double write error.

Example techniques for monitoring for database double write errors such as this one are provided herein. In an example method, a computing device receives a first indication of a first database write to a first database that includes information about the first database write. The computing device also receives a second indication of a second database write to a second database comprising information about the second database write. The first and second databases may be hosted on different nodes that may be geographically far apart. The databases may be relational databases, document-based or other "NoSQL" databases, in-memory key-value stores, or any other type of database with datatypes suitable for comparison as described below.

For example, the first and second indications may be reception of database transaction logs from disparate database nodes. The transaction logs may include records of all write operations associated with each database node including timestamps, the type of operation (e.g., insert, update, delete, etc.), the fields or columns affected, or the actual data written (or deleted). All or some portion of the records can constitute the information about the database writes.

The computing device then determines a time interval between the first database write and the second database write. For example, the first and second transaction logs can be used to determine the time between database write operations on the two nodes. In response to the time interval of a particular pair of write operations being less than a predefined threshold time interval, the computing device determines a difference between the first database write and the second database write based on a comparison of the first information about the first database write and the second information about the second database write.

4

For example, the predetermined threshold time interval may be 1 second. The computing device can use the transaction logs to identify database write operations that occurred 1 second or less apart. Some implementations may filter transaction log entries such that only database write operations involving similar data are compared to efficiently compare the transaction logs. For instance, if two transaction log entries are identified that occurred less than 1 second apart, affected the same data (e.g., in a relational database, at least one table and column in common), and wrote different data, they may be designated as different in this context.

The computing device then generates a double write error including the information about the first database write and the information about the second database write. For example, the computing device may first instantiate an error object in program code such as an instance of exception, error, or other throwable class that can be subsequently logged and otherwise handled by client applications of the database. The error object may contain details about the information contained in the first and second transaction logs. A typical example error object may include alphanumeric strings to identify the double written records, timestamps, and enumeration of the incorrect data.

The computing device likewise generates notifications that include information about the double write error. For example, notifications may include generation of emails, push notifications, on-screen alerts to dashboards, creation of support tickets, and so on. The computing device finally outputs the notification to cause a correction of the double write error.

For example, if the notification involves creation of a support ticket, such a support ticket may be assigned to support personnel that can manually or otherwise correct the double write error. Alternatively, automated systems may exist that can correct double write errors once they have been identified.

The innovations of the present disclosure provide significant improvements towards ensuring near-real-time database consistency. As data grows and applications become more complex, the consequences of inconsistencies become magnified, making operations unpredictable and unreliable. Particularly in the context of video conferences in which multiple participants are constantly sending and receiving data that must be perceptibly synchronous, the lack of a robust consistency mechanism can result in confusion, data loss, redundancy, application errors, and degraded user experience. Without the innovations described herein, persisted state among distributed nodes may diverge over time, making the entire cluster's state ambiguous. This divergence can lead to cascading errors, poor performance, or potential data loss. For example, if double write errors are not corrected immediately and are layered with additional database changes, it may quickly become impossible or impractical to roll back to a known good state without significant loss of data.

The features of the present application rely on high-frequency, periodic monitoring for double write errors using reliable database auditing mechanisms and provide a means to correct replication mechanism corner case failures using precision notification and alarm configurations. Where before such errors would have to be identified manually, through arduous custom database queries or even waiting for user error reports, they can now be automatically identified, logged, and acted upon. Moreover, the techniques of the present invention can be used to initiate corrective action through, for example, creation of a support ticket to that the double write error can be quickly corrected by engineering support personnel.

These illustrative examples are given to introduce the reader to the general subject matter discussed herein and the disclosure is not limited to these examples. The following sections describe various additional non-limiting examples of techniques for monitoring for database double write errors.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
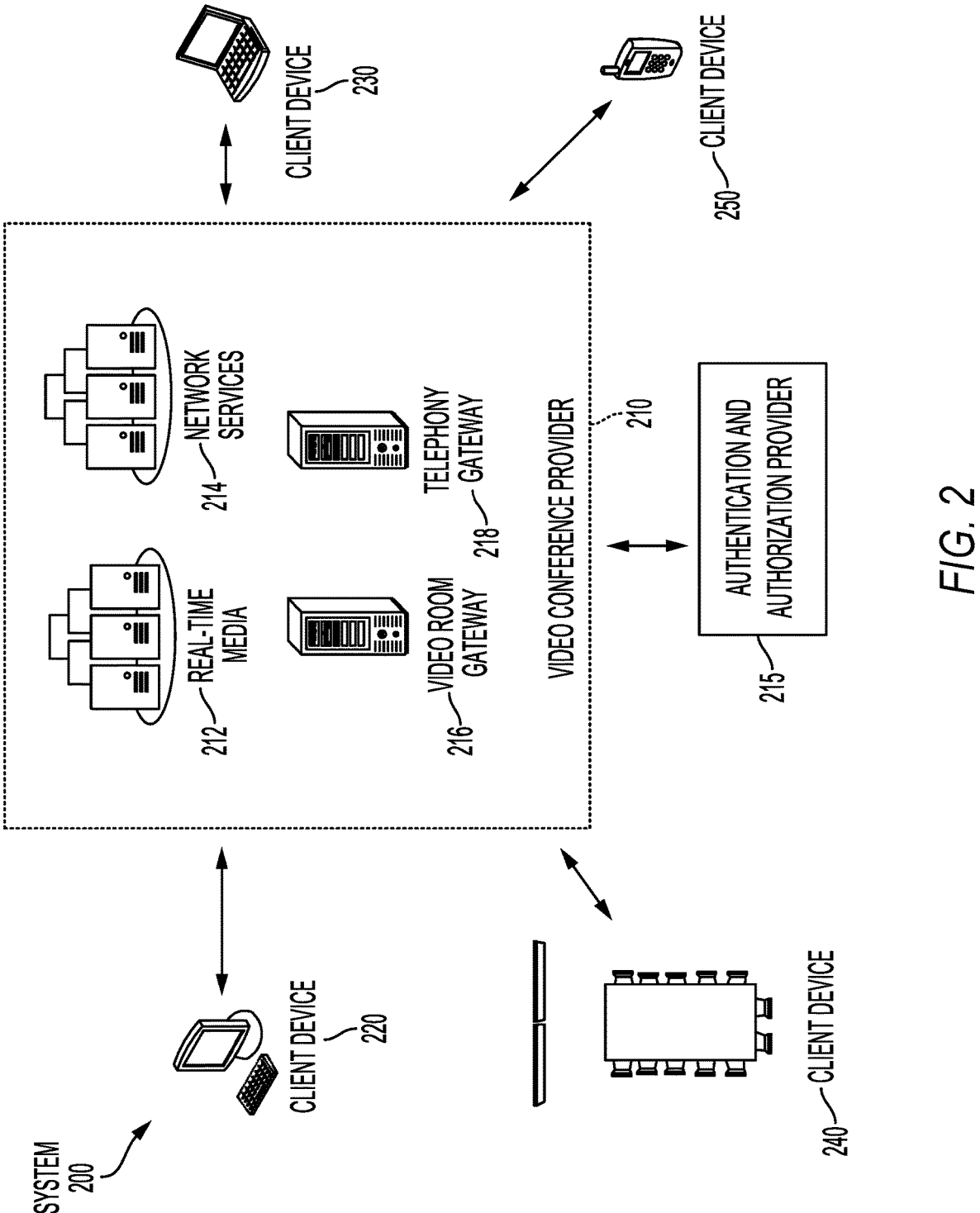
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request.

Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-toend encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
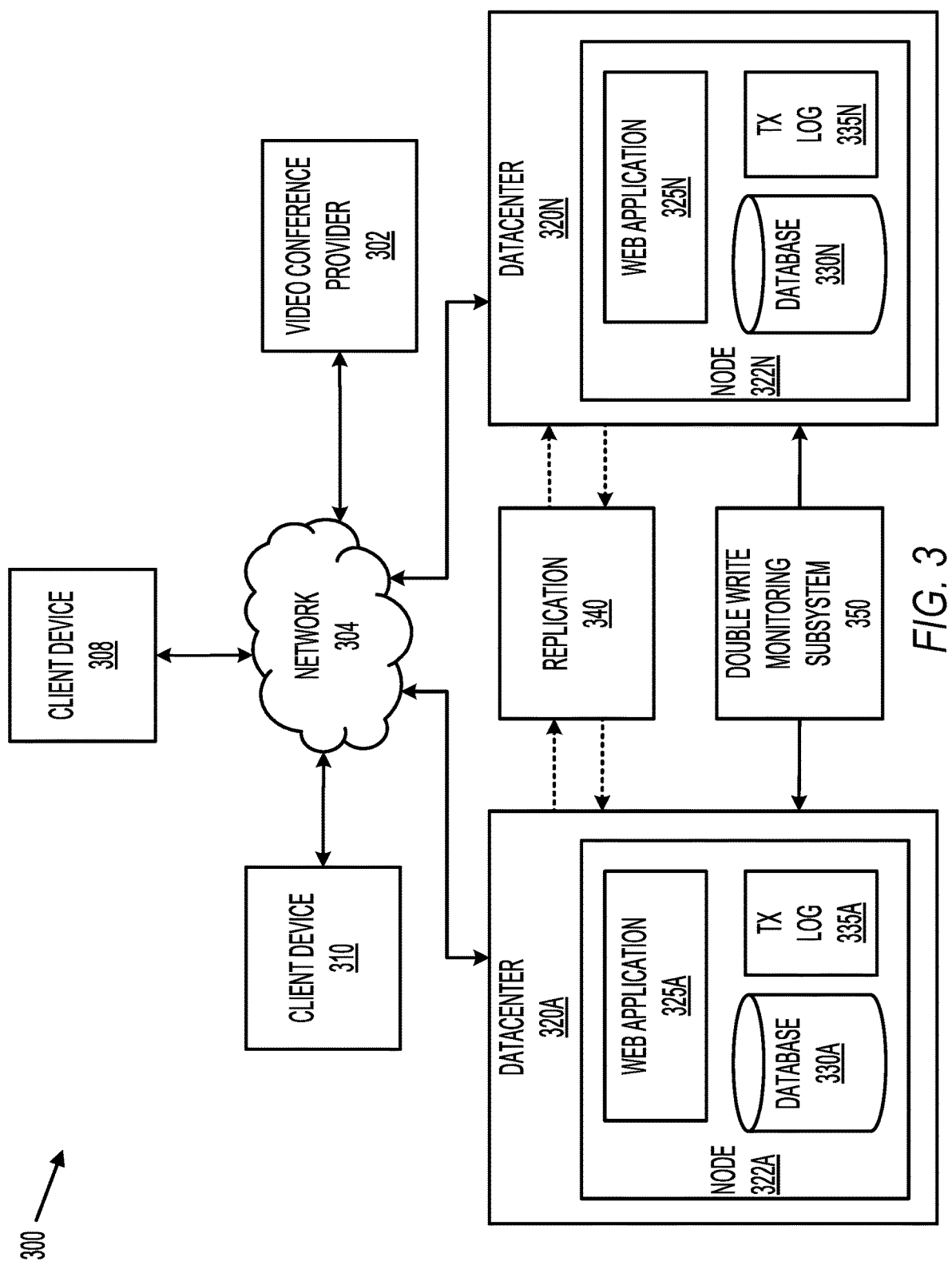
FIG. 3 shows an example of a system for database double write monitoring, according to some aspects of the present disclosure.

Referring now to FIG. 3, FIG. 3 shows an example of a system 300 for database double write monitoring, according to some aspects of the present disclosure. The example system 300 is depicted in the context of a video conference provider 302 providing video conferencing services to the client devices 308, 310. The client devices 308, 310 are communicatively coupled with a video conference provider 302. For example, the client devices 308, 310 may be coupled to the video conference provider over a network 304. The network 304 can include public networks, private networks, the Internet, or any other suitable combination of networked devices.

In the example system 300, the video conference provider 302 may be hosting a video conference with one or more participating client devices 308, 310. In some examples, a video conference may include the video streams or audio streams of each participant being sent from each respective client device 308, 310 to the video conference provider 302 and then to the client devices 308, 310 of the remaining participants.

Video conference provider 302 may make use of one or more databases while provisioning services for video conferencing. The databases can persist data that is later queried or updated in near-real-time during video conferencing operations. For example, data relevant to near-real-time video conferencing operations may include user profiles, meeting schedules, session metadata, and encryption keys. Even video and audio streams may be ephemerally persisted. For example, static video content, as may be seen during screen sharing, may be cached and persisted during a video conference to minimize the consumption of bandwidth.

Some databases may be operated in a "high-availability" (HA) configuration to ensure continuity of service even in the face of catastrophic network or server failures. For example, such failures may include server crashes, network blackouts, data corruption, or hardware malfunctions. HA can be implemented by way of various software and hardware redundancies, such as clustering, replication, load balancing, distributed file systems, virtualization, and so on.

For instance, an HA application may be implemented by way of a geographically distributed "cluster" of computing resources. The cluster can be configured with several nodes such that a complete loss of one node does not impact the functioning of the remaining nodes. In this context, a node refers to one or more server resources collectively accessible over a network, like the Internet. Typically, each node is located in a geographically disparate datacenter 320A . . . 320N, although not necessarily so. Geographic separation of the datacenters 320A . . . 320N may ensure more robust availability in the face of large-scale network disruptions.

Such clusters can be operated in various modes depending on the particular needs of a given application such as active-passive, active-active, round-robin, N+1 redundant, and so on. For example, a typical HA cluster configuration involves the active-passive mode. In active-passive mode, one or more nodes are active, while the others are on "standby." In standby, a node is configured to quickly become active. If an active node fails, a passive node is caused to assume the load of the failed active node manually or automatically.

Another possible configuration of an HA cluster or application is the active-active mode. In the active-active mode, all nodes in the cluster are active and share the network workload approximately equally. For example, a load balancer can be used to ensure that incoming network requests are distributed equally among the active nodes in the cluster. In this configuration, if one node fails, the remaining nodes can continue to handle the increased load.

Any number of nodes can be active in this mode. For example, some configurations may be in an active-active-active mode with three active nodes handling network requests simultaneously. Such multi-node active configurations may be particularly useful for the video conference provider 302 as a provisioner of video conferencing services due to the inherent scalability of such a configuration under unpredictable spikes in load.

Nodes 322A . . . 322N of an HA cluster located at geographically disparate datacenters 320A . . . 320N may include redundant instances of various components included in an application. For example, the nodes 322A . . . 322N include redundant web application instances 325A . . . 325N, database instances 330A . . . 330N, and associated transaction logs 335A . . . 335N. These examples are shown by way of illustration and a typical HA cluster may include other hardware or software redundancies in configurations adapted to particular design objectives.

For example, consider the instances of web application 325A . . . 325N that provides a service offered by a video conference provider 302, like an application programming interface (API) used by the video conferencing client device 308, 310. The nodes 322A . . . 322N may be operated in an active-active-active HA cluster with two or more active nodes 322A . . . 322N. Video conference participants may connect to a video conference using various client devices 308, 310 that connect to the API provided by the video conference provider 302 from disparate global locations. For example, the network requests associated with video conference participation may be routed to any of the active nodes 322A . . . 322N depending on the status of a load balancer, the physical location of the participants, the state of the network, and other factors.

Some HA configurations may include the maintenance of independent copies of data stores, like database instances 330A . . . 330N that store operational information for applications. Web application users expect equivalent functionality regardless of which node their network requests are directed to, and such details are typically transparent to video conference participants. Maintaining such database instances 330A . . . 330N in near-real-time synchronization may involve various replication mechanisms as implemented in, for instance, replication component 340. For example, one node 322A can accept write operations and immediately replicate the changes to one or more other nodes 322N. The replication can be synchronous, in which the first node 322A waits for acknowledgment from the other node(s) 322N before confirming a write, or asynchronous, in which the first node 322A continues operations without waiting for confirmation. Synchronous replication mechanisms may operate as soon as database writes occur or may cause replication periodically, within some predetermined time interval (e.g., every second). In some examples, replication may occur once a certain number of writes occur or once a time interval has expired, whichever occurs first.

The property of database clusters that includes a guarantee that a read from any given database instance 330A . . . 330N will return the most recent database write is known as consistency. Consistency guarantees may be implemented in different ways, involving certain trade-offs. For example, strong consistency guarantees that after a write, reads will always reflect that write or any subsequent writes. Eventual consistency, on the other hand, guarantees that, following a specified period of time, database instances 330A . . . 330N will converge to the most recent write.

Nevertheless, even HA clusters with replication mechanisms and consistency guarantees in place may still be vulnerable to consistency errors. A loss of consistency between database instances 330A . . . 330N may result in failures during video conferencing such as dropping video or audio synchronization, audio-video mismatch, dropped connections, or incorrect display of shared content. Additionally, latency discrepancies between databases can result in participants observing events at different times, leading to communication disruptions. In severe error scenarios, a significant loss of consistency between database instances 330A . . . 330N may result in premature termination of an in-progress video conference.

An example scenario in which a loss of consistency occurs between database instances 330A . . . 330N including a replication component 340 involves a double write error. For example, at time $t_1$, a value may be written to a particular field at a first database instance 330A. At $t_2$, the replication component 340 on the first database instance 330A transmits the persisted value to a second database instance 330N. Then at $t_3$, a different value may be written to the particular field at the second database instance 330N. This may occur when, for example, a load balancer directs the first write to one node 322A and the second write to another node 322N. Importantly, the second write occurs before the arrival of the message from the replication component 340. Then, at $t_4$, the replication message from the first database instance 330A arrives at the second database instance 330N and is written, overwriting the new value with the original value. Thus, the original value is persisted on both the first and second database instances 330A, 330N where the new value should be. This state of affairs is a simple example of a double write error. Additional scenarios will discussed in FIG. 4 and the accompanying description.

As mentioned, the system 300 includes a replication component 340 that implements one or more replication mechanisms. Replication component 340 can be used to enforce consistency guarantees among database instances 330A . . . 330N located at geographically disparate nodes 322A . . . 322N. In some examples, the replication component 340 may, for example, may finalize a database write operation only once it has been written to the configured replicas. Database double write errors may be more likely when the replication component 340 is operating in an asynchronous configuration in which database write operations proceed without confirmation of replication.

The replication component 340 implementation may depend upon the database type. For example, relational databases may use SQL statements to cause replication whereas document-based databases may use a transaction or operations log to "play back" write operations on replicas.

Replication may occur continuously, immediately following write operations or may occur at intervals. The intervals may be defined by the passage of time, the accumulation of data to replicate, the occurrence of certain events, or a combination of these. The operation of the replication component 340 may configured according to the required latency and system load.

The system 300 includes a double write monitoring subsystem 350. The double write monitoring subsystem 350 includes components for detecting, logging, and acting upon detected database double writes. In some examples, the double write monitoring subsystem 350 may use the transaction logs 335A . . . 335N to identify double write errors. An example implementation of the double write monitoring subsystem 350 is shown in FIG. 4 and the accompanying description.

Figure 4:
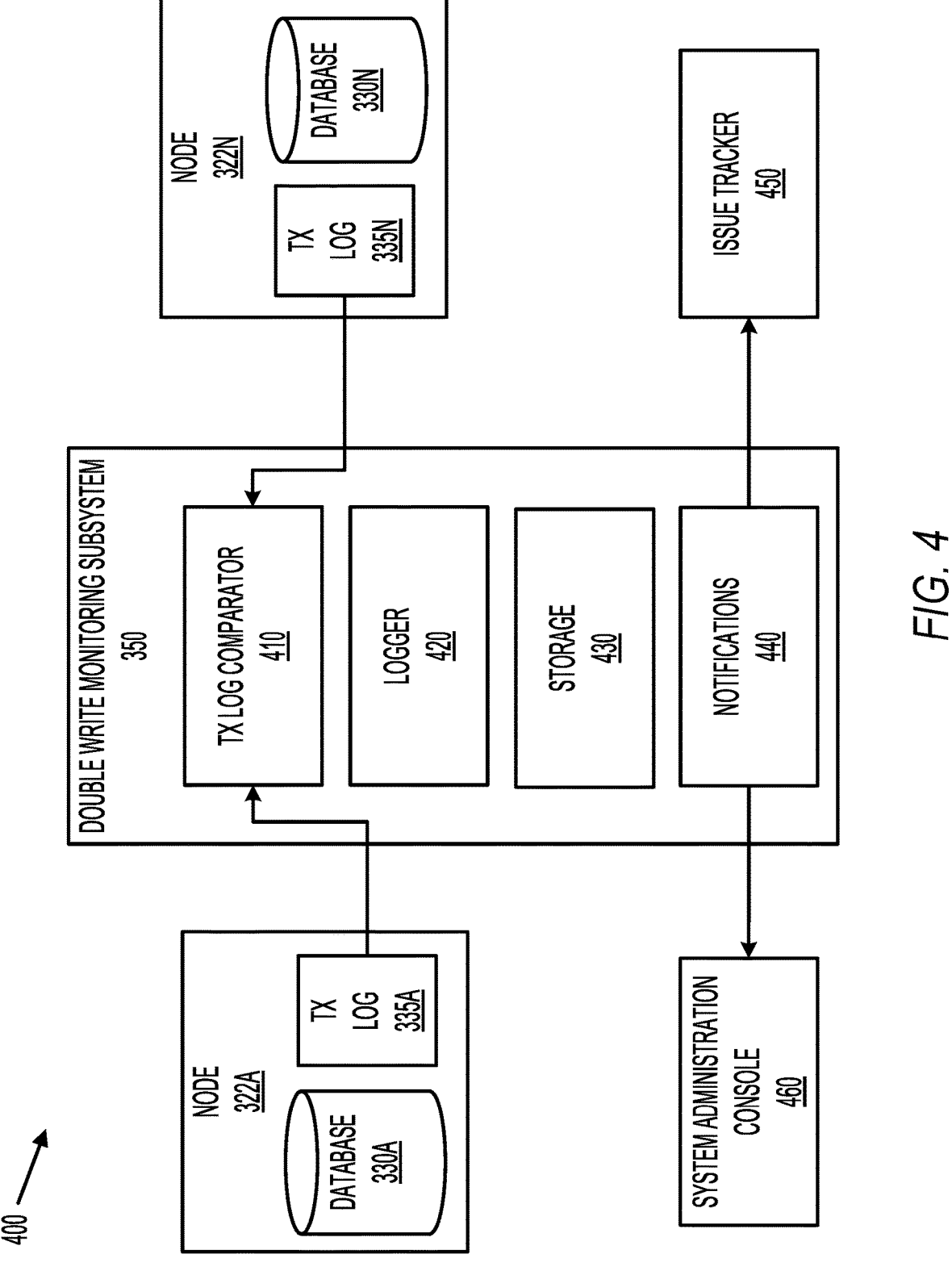
FIG. 4 shows an example of a system implementing database double write monitoring, according to some aspects of the present disclosure.

Referring now to FIG. 4, FIG. 4 shows an example of a system 400 implementing database double write monitoring, according to some aspects of the present disclosure. In particular, FIG. 4 shows an example implementation of the database double write monitoring subsystem 350. FIG. 4 includes nodes 322A . . . 322N and only certain components shown in FIG. 3 such as database instances 330A . . . 330N and transaction logs 335A . . . 335N for clarity.

Database double write monitoring subsystem 350 includes a transaction log comparator 410. The transaction log comparator 410 receives information about database writes from various sources such as the transaction logs 335A . . . 335N. Database writes can include any operation that temporarily or permanently modifies a database. Typical examples of database operations in relational databases include insert, update, and delete operations. Likewise, typical example of database operations in document-based databases include create, modify, and remove operations. Many other examples are possible, consistent with the type and particular implementation of the database instances 330A . . . 330N. Database writes are not limited to data, and may include, for example, data definition operations, like creation, modification, or deletion of tables or collections.

The various sources of transaction logs 335A . . . 335N may include any record of database write operations maintained by database instances 330A . . . 330N. In a typical example, the transaction logs 335A . . . 335N correspond only to the database instance in the same node. Thus, the transaction logs 335A . . . 335N, unlike the database instances 330A . . . 330N, may not be mirrored or replicated, and serve only to reflect the database operations that have occurred in the particular node. However, in some examples, the transaction log may be a shared component or centrally located transaction logger. For instance, a single transaction log instance or server may record database operations for a plurality of database instances 330A . . . 330N. In that case, the transaction log comparator 410 may query or filter the transaction log data in order to compare transaction log data corresponding to different database instances 330A . . . 330N.

In some examples, the transaction logs 335A . . . 335N may be binary logs, sometimes called binlogs, created by a particular relational database like MySQL. Binary logs may includes series of log files containing binary data representing write operations to a database instance 330A . . . 330N. Binary logs may include statement-based logging in which the database instance 330A . . . 330N logs the statement or command that caused a write. Other paradigms include row-based logging, which can include writes made to individual rows or records or a combination of the two (e.g., mixed logging).

The transaction logs 335A . . . 335N such as binary logs may include a non-human-readable format optimized for machine processing. The transaction logs 335A . . . 335N may include other formats, such as text-based logs that are human-readable, capturing data modifications in a textual format that administrators can directly inspect. Other formats include structured formats such as extensible markup language (XML) or JavaScript object notation (JSON) logs, that include some benefits of machine-readable logs that can be parsed or transformed easily.

The transaction logs 335A . . . 335 may include information about the database writes such as transaction metadata, transaction information, and one or more data changes. In the context of a database, a transaction typically refers to a sequence of one or more operations that are executed as a single unit of work. For example, transaction metadata can include timestamps indicating when the transaction began and ended, transaction IDs that uniquely identify each transaction, and user or system IDs showing who or what initiated the transaction. Transaction information may include details about the type and nature of the database operation. For instance, this may specify whether the transaction was an insert, update, delete, or some other type of operation, which database or schemas were involved, special options or parameters, and so on. Data changes may refer to the actual content changes made to the database. For instance, this may include details about the state of a particular unit of data before and after the write operation.

Transaction log comparator 410 may thus, from the transaction metadata, determine a time interval between database writes. In cases where the time interval between database writes is less than a predefined threshold time interval, the transaction log comparator 410 can analyze transaction log entries to determine differences between database writes occurring on distinct database instances 330A . . . 330N within the predefined time interval. Because the strongest possible consistency among database instances 330A . . . 330N is desirable, particularly in the context of live video conferences, the predefined threshold time interval may be selected empirically to be as low as practically possible. A typical value of the predefined threshold time interval may be 1 second or less.

In some examples, the transaction log comparator 410 may compare the transaction logs 335A . . . 335N by determining the write operation and one or more affected fields from each log. For example, an affected field may be column in a relational database table whose data was inserted, updated, or deleted. The data written (or deleted) may be referred to as the affected data. A difference between transaction logs 335A . . . 335N may thus be determined by comparing write operations that affect the same fields.

In some examples, after determining the timestamp of particular transaction logs entries, the transaction log comparator 410 may serialize the transaction log entries for comparison. Serialization of the transaction log entries may include converting the entries into a format that can be compared using text-based tools and may thus rely on a standardized representation. For example, a transaction log entry with multiple fields like transaction ID, timestamp, table name, and data changes, might be serialized into a JSON or XML string. The resulting serialized strings can be compared to determine transaction log entry differences based on, for example, the presence of a write operation, the same affected fields, and different affected data.

In some examples, the transaction logs 335A . . . 335N may be filtered before entries are compared. For example, upon determination of a transaction log entry with a particular timestamp (e.g., based on the transaction log entry metadata), a time interval can be determined based on the duration of the predefined time interval. The transaction logs 335A . . . 335N can be queried or otherwise filtered for entries that correspond to only to that range. The filtered entries can be compared to determine transaction log entry differences based on, for example, the presence of a write operation, the same affected fields, and different affected data. By filtering the transaction logs 335A . . . 335N before comparison operations begin, the volume of data to be processed can be reduced, further improving efficiency and thereby improving the time to restoration of consistency. For example, entries can be selected from the transaction logs 335A . . . 335N by filtering out timestamps outside a time range defined by the sum of the timestamp of a database write and the predefined threshold time interval and the difference between the same timestamp and the predefined threshold time interval.

A difference between transaction log entries on disparate database instances 330A . . . 330N affecting the same fields may be designated as a double write error. For instance, one example of a double write error may be an inconsistent database state occurring due to a conflict between normal database write operations and replication mechanisms. The result is either data that is incorrect (e.g., stale) on one or more database instances 330A . . . 330N or inconsistent (e.g., different) data on one or more database instances 330A . . . 330N.

Upon identification of a double write error, the transaction log comparator 410 may generate a double write error including information about database writes involved. The generated error may be an error object including an error code, description, title, as well as the information about the database writes involved. The error object can be used in program code to raise an exception, log the error, notify system administrators about the error, and so forth. For instance, the error object may be an instance of exception, error, or other throwable class. The serialized error object can be logged or the error object may be handled using a language-appropriate handling mechanism to cause notifications or automatic corrective actions.

Database double write monitoring subsystem 350 includes a logger 420. For example, the logger 420 may be used to record information about detected double write errors for auditing purposes. The logger 420 may, for example, log a serialized version of the double write error object generated by the transaction log comparator 410.

The database double write monitoring subsystem 350 includes a storage component 430. The storage component 430 may include a memory device such as a database or in-memory cache for permanently or temporarily persisting information about double write errors. For example, in addition to logging such errors by logger 420, the storage component 430 may also record the double write error information for subsequent trend analysis, troubleshooting, rollback, and so on.

Database double write monitoring subsystem 350 includes a notification component 440. The notification component can generate notifications based on information about identified double write errors and output the notifications to cause a correction of the double write error.

In some examples, the notifications component 440 may output a command to generate a support request including information about identified double write errors. For example, the notifications component 440 may use an API provided by issue tracker 450 to send the support request to the issue tracker 450. The issue tracker 450 may then generate a corresponding support ticket that may be used by system or database administrators to correct the double write error. Support tickets may also be known as issues, bug reports, helpdesk requests, incident reports, and so on.

For instance, the notifications component 440 may use an API provided by an issue tracker 450 like JIRA to create a JIRA ticket. The JIRA ticket may be automatically assigned to a system or database administrator or other support personnel, who may subsequently receive a notification of the same via push notification or email. The creation and reception of a JIRA ticket may cause prioritization and immediate correction of a potentially critical system issue by an organization.

Correction of the double write error may involve steps such as determining details about the database writes that cause the error, generating a corrective database transaction based on those details, an executing the corrective database transaction. For instance, the corrective database transaction may be, using the example of a relational database, a SQL statement (or other database command) that locks the affected tables for writing and restores the database instances 330A . . . 330N to a consistent state. However, other types of databases can also be used. For instance, in the example of a document-based database, a document that specifies an operation such as "upsert" may be used to overwrite or correct the affected collections to restore the document stores instances to a consistent state Referring now to FIG. 5, FIG. 5 shows an example of a system 500 illustrating several circumstances under which a database double write error may occur, according to some aspects of the present disclosure. FIG. 5 shows an example system 500 that is may be a simple, two-node high-availability database cluster with 2 database instances 330A, 330N in an active-active mode, as described previously.

The following operations will be used during the explication of FIG. 5. Importantly, the operations may occur in any logically consistent order, as will be seen during the following discussion. At 510, data $d_1$ is written to database instance 330A by an application. At 520, data $d_2$ is written to database instance 330N by an application. The data $d_1$ and $d_2$ may be, for example, values in one or more columns included in one or more rows of a relational database. In FIG. 5, examples such as "id=$d_1$" are shown for illustrative purposes that may correspond to updating the "id" column of a relational database. Equivalently, the data $d_1$ and $d_2$ may be documents in a document store. Other data types corresponding to other types of databases may also be possible. The concepts illustrated in FIG. 5 are not intended to be limiting with respect to data, data types, or database types.

At 530, a replication mechanism, e.g., replication component 340, sends data $d_1$ from database instance 330A to database instance 330N. Similarly, at 540, the replication mechanism sends data $d_2$ from database instance 330N to database instance 330A. In both 530 and 540, the replication mechanism is provided to ensure consistency between database instances 330A and 330N.

In this example configuration, double write errors may occur in several ways depending on the order and timing of these operations 510-540. In a first example, operation 510 occurs first: data $d_1$ is written to database instance 330A. Then, operation 520 occurs: data $d_2$ is written to database instance 330N. Then, operation 530 occurs: the replication mechanism sends data $d_1$ from database instance 330A to database instance 330N, overwriting $d_2$. Then, operation 540 occurs: the replication mechanism sends data $d_2$ from database instance 330N to database instance 330A, overwriting $d_1$. In the final state, database instance 330A includes $d_2$ and database instance 330N includes $d_1$, an inconsistent state. A similar result obtains when operation 520 is followed by operation 510, operation 540, and then operation 530. In that example, in the final state, database instance 330A includes $d_1$ and database instance 330N includes $d_2$, another inconsistent state.

The inconsistent state occurs when the database write operations 510-520 occur on a time scale that is shorter than the replication mechanism. In the methods of the present disclosure, this is accounted for by determining database write operations on distinct database instances 330A . . . 330N that occur within a predefined time interval, such as 1 second or less.

In some examples, the predefined time interval may be selected to be on a time scale that is characteristic of the replication mechanism. For example, a profiling operation can be used to determine the approximate time between the reception of a database write operation and the subsequent replication of that write to another database instance. The approximate time can be used as a basis for establishing the predefined time interval. A trial and error approach can be used as well, in which the predefined time interval is initially chosen and then compared with a measured rate of double write errors to select an optimized predefined time interval.

In contrast, a successful write operation may include operation 510 followed by operation 530 (replication). After about 1 second or more, operation 520 occurs followed by operation 540 (replication). In the final state, database instance 330A includes $d_2$ and database instance 330N includes $d_2$, consistent with the order of operations and user expectations, since write operation 520 occurred chronologically after write operation 510.

It will be appreciated by one of ordinary skill in the art that the scenarios just illustrated with respect to the system 500 are examples of sequences of events that may lead to double write errors. Double write errors may result anytime data is written faster than the characteristic time for operation of the replication mechanism in a manner that is inconsistent with the logical, chronological ordering of the requested database writes. It may occur, for example, as a result of network latency or bottlenecks, resource demands on the replication mechanism, high transaction volume, or an inefficient replication mechanism.

Figure 6:
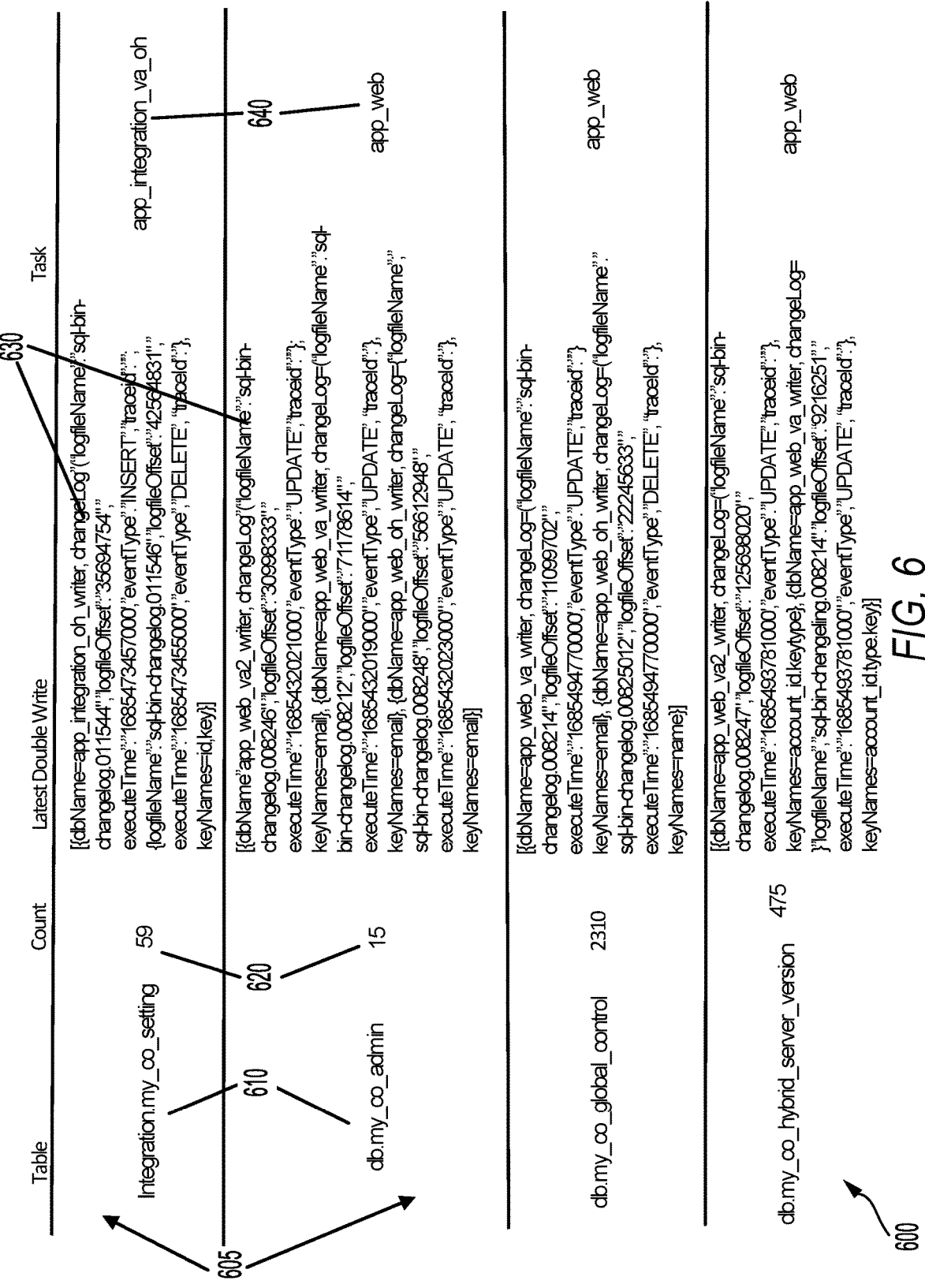
FIG. 6 shows an example of a log illustrating several instances of identified database double write errors, using some methods of the present disclosure.

Referring now to FIG. 6, FIG. 6 shows an example of a log 600 illustrating several instances of identified database double write errors, using some methods of the present disclosure. The log 600 as may be generated, for example, by logger 420. Log 600 may correspond to database double writes identified in a relational database such as MySQL or PostgreSQL. Log 600 includes several rows 605, each of which may correspond to an identified double write error. Each row 605 may include identification of the table(s) 610 that are affected by the double write error. Some examples may include a count 620 of the number of database double write errors that have occurred. For instance, if database double write errors are occurring as a result of a systemic network or server error, a large number of double write errors may occur.

Log 600 may include a representation of the transaction logs 630 that are compared to determine and identify the database double write error. For example, in log 600 the transaction logs 630 are represented by a pair of serialized JSON objects in an array. The first serialized JSON object may correspond to a write operation in a first database instance and the second serialized JSON object may correspond to a write operation in a second database instance. The example transaction logs 630 illustrate a serialized transaction log using row-based logging, in which the changes to the columns are shown as opposed to the SQL statements used to make those changes. Comparison of the transaction logs 630 may be used to troubleshoot and correct the database double write error by system or network administrators.

In some examples, log 600 may include task(s) 640. For example, a task-or event-based framework can be used to periodically querying or otherwise examine the transaction logs of the database instances in a cluster to identify double write errors at the specified periodicity. The periodicity may be empirically determined or may be selected based on characteristic values of the system such as the predefined time interval or the approximate time for operation of the replication component 340.

Referring now to FIG. 7, FIG. 7 shows a flowchart of an example method 700 for database double write monitoring. The description of the method 700 in FIG. 7 will be made with reference to FIGS. 3-6, however any suitable system according to this disclosure may be used, such as the example systems 100 and 200, shown in FIGS. 1 and 2.

It should be appreciated that method 700 provides a particular method for database double write monitoring. Other sequences of operations may also be performed according to alternative examples. For example, alternative examples of the present disclosure may perform the steps outlined above in a different order. Moreover, the individual operations illustrated by method 700 may include multiple sub-operations that may be performed in various sequences as appropriate to the individual operation. Furthermore, additional operations may be added or removed depending on the particular applications. Further, the operations described in method 700 may be performed by different devices. For example, the description is given from the perspective of a server hosting the database double write monitoring subsystem 350 but other configurations are possible. For instance, in some implementations the double write monitoring subsystem 350 may be included in the video conference provider 302. One of ordinary skill in the art would recognize many variations, modifications, and alternatives.

The method 700 may include block 710. At block 710, a computing device receives a first indication of a first database write to a first database comprising first information about the first database write. Likewise, at block 720, the computing device receives a second indication of a second database write to a second database comprising second information about the second database write.

One of skill in the art will appreciate that the first and second database, while described here using the example of a relational database, can be any suitable database with a transaction log or the like, comparable records, including timing information, and a replication mechanism with a delay sufficient to introduce the possibility of a double write error. For example, the database may be a relational database management system (e.g., a SQL database), a NoSQL database, an in-memory database, a column store database, a document-oriented database, a key-value store, a graph database, a time-series database, or a flat file database, among other examples.

For example, the first and second indications may be the reception of database transaction logs 335A . . . 335N from disparate database instances 330A . . . 330N. The transaction logs 335A . . . 335N may include records of all write operations associated with each database node including timestamps, the type of operation (e.g., insert, update, delete, etc.), the fields or columns affected, or the actual data written (or deleted).

The transaction logs 335A . . . 335N may be received following a query to an API provided by database instances 330A . . . 330N by the transaction log comparator 410, as described in FIG. 4 and the accompanying description. Alternatively, the database instances 330A . . . 330N or other component located on nodes 322A . . . 322N may push updated transaction logs 335A . . . 335N to the transaction log comparator 410 according to a configured event-based framework, messaging framework, or subscription-based paradigm.

At block 730, the computing device determines a time interval between the first database write and the second database write. For example, the transaction logs 335A . . . 335N can be used to determine the time between pairs or groups of database write operations on disparate nodes 322A . . . 322N. For instance, the information about the database writes may include timestamps corresponding to the database write operations. In some examples, additional queries may be needed to obtain the timestamps. In some examples, the timestamps may need to be converted to a form suitable for comparison. For example, for geographically diverse sources, conversions based on time zone or network latency may be required.

At block 740, responsive to the time interval being less than a predefined threshold time interval, the computing device determines a difference between the first database write and the second database write based on a comparison of the first information about the first database write and the second information about the second database write. For example, the predetermined threshold time interval may be 1 second or less, corresponding to a characteristic time for operation of the replication component 340.

The transaction log comparator 410 can use the transaction logs 335A . . . 335N to identify database write operations that occurred 1 second or less apart using the timestamps determined previously. Identified pairs or groups of writes may be immediately persisted using the storage component 430 or stored in-memory for generation of notification or other corrective action.

At block 750, the computing device generates a double write error comprising the first information about the first database write and the second information about the second database write. For example, the transaction log comparator 410 may instantiate an error object including information about the database writes that can be raised as an exception or logged. A typical example error object may include alphanumeric strings to identify the double written records in the logger 420, timestamps, and enumeration of the incorrect data, as shown in the example logs of FIG. 6 and the accompanying description.

At block 760, the computing device generates a notification comprising third information about the double write error. For example, notifications may include generation of emails, push notifications, on-screen alerts to dashboards, creation of support tickets, and so on. In each case, the corresponding notification can be generated using a suitable API. For example, the issue tracker 450 may provide an API for programmatic creation of support tickets. The issue tracker 450 API can be used for creation, updating, deletion, logging, and so on. The created support ticket may include, for example, the error object, information about the database writes, network and database information, and any other information that may be germane to correction of the double write error.

At block 770, the computing device outputs the notification to cause a correction of the double write error. For example, if the notification involves creation of a support ticket, such a support ticket may be assigned to support personnel that can manually or otherwise correct the double write error.

Alternatively, automated systems may exist that can correct double write errors once they have been identified. For example, some systems may include a component that can receive the information about the double write errors and automatically generation SQL code (or other database instructions) to correct the error. In some examples, the SQL code must still be reviewed and manually executed by a network or system administrator. In some examples, the database can be automatically rolled back to a known consistent state pending resolution of the double write error.

Figure 8:
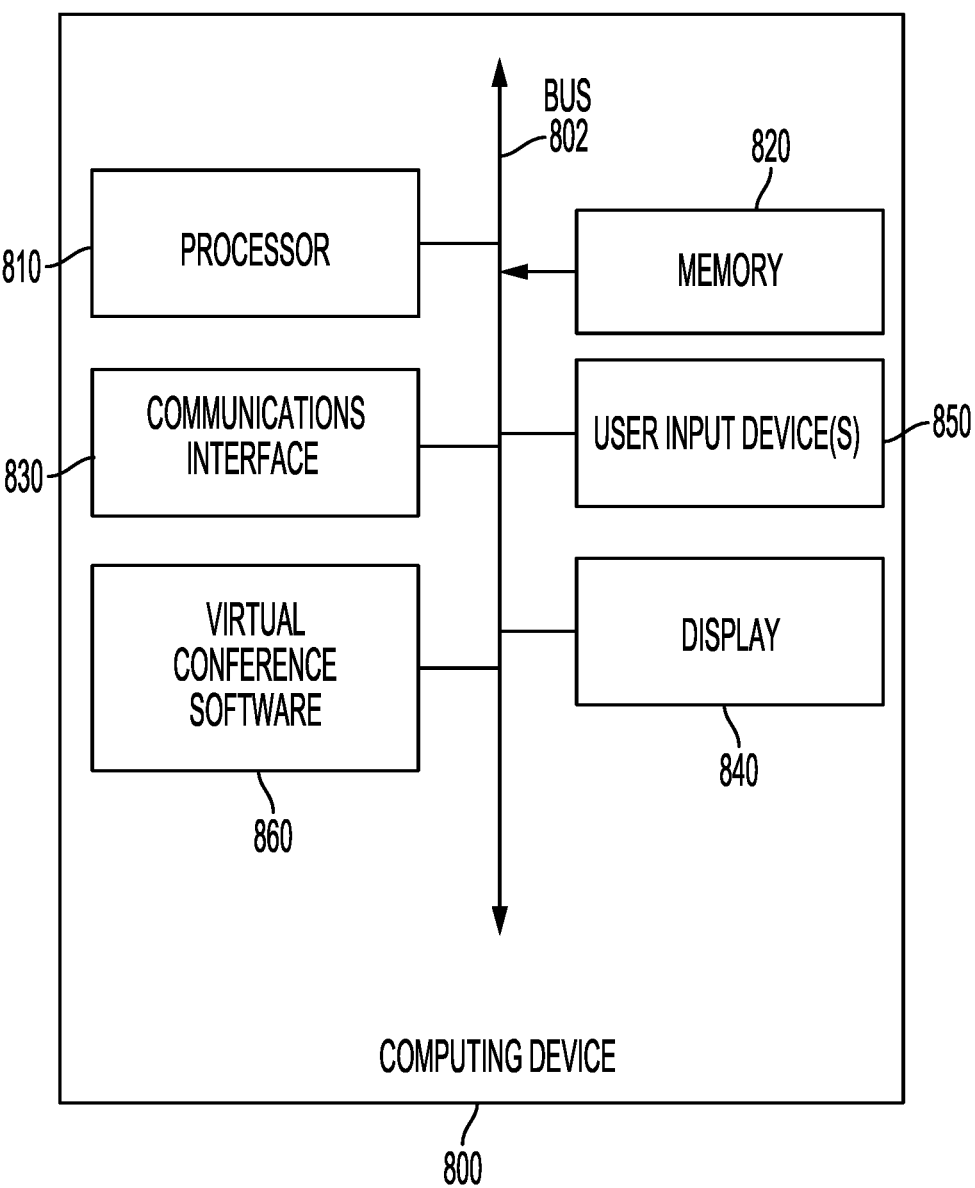
FIG. 8 shows an example computing device suitable for use in techniques for database double write monitoring, according to some aspects of the present disclosure.

Referring now to FIG. 8, FIG. 8 shows an example computing device 800 suitable for use in example systems or methods for providing database double write monitoring according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for database double write monitoring according to different examples, such as part or all of the example method 700 described above with respect to FIG. 7. The computing device 800, in this example, also includes one or more user input devices 850, such as a keyboard, mouse, touchscreen, microphone, etc., to accept user input.

The computing device 800 also includes a display 840 to provide visual output to a user.

In addition, the computing device 800 includes virtual conferencing software 860 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: receiving a first indication of a first database write to a first database comprising first information about the first database write; receiving a second indication of a second database write to a second database comprising second information about the second database write; determining a time interval between the first database write and the second database write; responsive to the time interval being less than a predefined threshold time interval, determining a difference between the first database write and the second database write based on a comparison of the first information about the first database write and the second information about the second database write; generating a double write error comprising the first information about the first database write and the second information about the second database write; generating a notification comprising third information about the double write error; and outputting the notification to cause a correction of the double write error.

Example 2 is the method of example(s) 1, further comprising receiving a third indication of a third database write to the second database comprising fourth information about the third database write, wherein: the time interval between the first database write and the third database write is less than the predefined threshold time interval; and the double write error further comprises the fourth information about the third database write.

Example 3 is the method of example(s) 1, further comprising: generating a support request comprising the third information about the double write error; and outputting the support request to cause generation of a support ticket, comprising the third information about the double write error and fourth information about the correction of the double write error.

Example 4 is the method of example(s) 1 wherein the first indication of the first database write is received from a first transaction log and the second indication of the second database write is received from a second transaction log.

Example 5 is the method of example(s) 4, wherein: according to a specified periodicity: the first indication is determined by querying the first transaction log at the specified periodicity; and the second indication is determined by periodically querying the second transaction log at the specified periodicity.

Example 6 is the method of example(s) 4, wherein: determining the difference between the first database write and the second database write based on the comparison of the first information about the first database write and the second information about the second database write comprises: determining, from the first transaction log, a first operation and one or more first affected fields, each first affected field comprising first affected data; determining, from the second transaction log, a second operation and one or more second affected fields, each second affected field comprising second affected data; determining that the first operation and the second operation are write operations; determining that at least one of the one or more first affected fields is included in the one or more second affected fields; and determining that the first affected data of the at least one of the one or more first affected fields included in the one or more second affected fields differs from the corresponding second affected data in the one or more second affected fields.

Example 7 is the method of example(s) 4, wherein determining the difference between the first database write and the second database write based on the comparison of the first information about the first database write and the second information about the second database write comprises: determining, from the first transaction log, a first transaction log entry corresponding to the first indication, the first transaction log entry comprising a first timestamp and a first affected field comprising first affected data; determining, from the second transaction log, a second transaction log entry corresponding to the second indication, the second transaction log entry comprising a second timestamp and a second affected field comprising second affected data; serializing the first transaction log entry and the second transaction log entry; and comparing the serialized first transaction log entry and the serialized second transaction log entry, comprising: determining that a first difference between the first timestamp and the second timestamp is less than the predefined threshold time interval; determining that the first affected field corresponds to as the second affected field; and determining a second difference between the first affected data and the second affected data.

Example 8 is the method of example(s) 4, wherein determining the difference between the first database write and the second database write based on the comparison of the first information about the first database write and the second information about the second database write comprises: filtering the first transaction log, comprising: determining, from the first indication, a first timestamp; and selecting, from the first transaction log, one or more first transaction log entries, wherein the one or more first transaction log entries comprise timestamps within a first time range defined by a sum of the first timestamp and the predefined threshold time interval and a difference between the first timestamp and the predefined threshold time interval; filtering the second transaction log, comprising: determining, from the second indication, a second timestamp; and selecting, from the second transaction log, one or more second transaction log entries, wherein the one or more second transaction log entries comprise timestamps within a second time range defined by a sum of the second timestamp and the predefined threshold time interval and a difference between the second timestamp and the predefined threshold time interval; and determining the difference between the first database write and the second database write based on the comparison of the first information about the first database write and the second information about the second database write using the one or more first transaction log entries and the one or more second transaction log entries.

Example 9 is the method of example(s) 1, wherein the first information about the first database write comprises transaction metadata, transaction information, and one or more data changes.

Example 10 is the method of example(s) 1, wherein the correction of the double write error comprises: determining a latest database write based on the first information about the first database write and the second information about the second database write; generating a corrective database transaction based on the latest database write; and executing the corrective database transaction to correct the double write error.

Example 11 is a non-transitory computer-readable medium storing instructions that, when executed by one or more processors, cause the one or more processors to perform operations including: receiving a first indication of a first database write to a first database comprising first information about the first database write; receiving a second indication of a second database write to a second database comprising second information about the second database write; determining a time interval between the first database write and the second database write; responsive to the time interval being less than a predefined threshold time interval, determining a difference between the first database write and the second database write based on a comparison of the first information about the first database write and the second information about the second database write; generating a double write error comprising the first information about the first database write and the second information about the second database write; generating a notification comprising third information about the double write error; and outputting the notification to cause a correction of the double write error.

Example 12 is the non-transitory computer-readable medium of example(s) 11, further comprising the operations: receiving a third indication of a third database write to the second database comprising fourth information about the third database write; determining a second difference between the first database write and the third database write; and determining a third difference between the second database write and the third database write, wherein: the time interval between the first database write and the third database write is less than the predefined threshold time interval; and the double write error further comprises the fourth information about the third database write.

Example 13 is the non-transitory computer-readable medium of example(s) 11, further comprising the operations: generating a bug report comprising the third information about the double write error; and outputting the bug report to cause generation of a support ticket, comprising the third information about the double write error and fourth information about the correction of the double write error.

Example 14 is the non-transitory computer-readable medium of example(s) 11, wherein the first indication of the first database write is received from a first transaction log and the second indication of the second database write is received from a second transaction log.

Example 15 is the non-transitory computer-readable medium of example(s) 11, wherein the first indication of the first database write is received from a first transaction log and the second indication of the second database write is received from a second transaction log, wherein the first and second transaction logs each comprise binary logs.

Example 16 is a system comprising: one or more processors; and one or more computer-readable storage media storing instructions which, when executed by the one or more processors, cause the one or more processors to perform operations including: receiving a first indication of a first database write to a first database comprising first information about the first database write; receiving a second indication of a second database write to a second database comprising second information about the second database write; determining a time interval between the first database write and the second database write; responsive to the time interval being less than a predefined threshold time interval, determining a difference between the first database write and the second database write based on a comparison of the first information about the first database write and the second information about the second database write; generating a double write error comprising the first information about the first database write and the second information about the second database write; generating a notification comprising third information about the double write error; and outputting the notification to cause a correction of the double write error.

Example 17 is the system of example(s) 16, further comprising the operations: generating a helpdesk request comprising the third information about the double write error; and outputting the helpdesk request to cause generation of a support ticket, comprising the third information about the double write error and fourth information about the correction of the double write error.

Example 18 is the system of example(s) 17, wherein the fourth information about the correction of the double write error comprises instructions to: determine a latest database write based on the first information about the first database write and the second information about the second database write; generate a corrective database transaction based on the latest database write; and executing the corrective database transaction to correct the double write error.

Example 19 is the system of example(s) 16, wherein the first indication of the first database write is received from a first transaction log and the second indication of the second database write is received from a second transaction log, wherein the first and second transaction logs each comprise binary logs, wherein the binary logs are accessed using a binary log connector.

Example 20 is the system of example(s) 19, wherein determining the difference between the first database write and the second database write based on the comparison of the first information about the first database write and the second information about the second database write comprises the operations: accessing the first transaction log and the second transaction log using the binary log connector; determining, from the first transaction log, a first operation and one or more first affected fields, each first affected field comprising first affected data; determining, from the second transaction log, a second operation and one or more second affected fields, each second affected field comprising second affected data; determining that the first operation and the second operation are write operations; determining that at least one of the one or more first affected fields is included in the one or more second affected fields; and determining that the first affected data of the at least one of the one or more first affected fields included in the one or more second affected fields differs from the corresponding second affected data in the one or more second affected fields.

That which is claimed is:

1. A method, comprising:
receiving a first indication of a first database write to a first database comprising first information about the first database write;
receiving a second indication of a second database write to a second database comprising second information about the second database write;
determining a time interval between the first database write and the second database write;
responsive to the time interval being less than a predefined threshold time interval, determining a difference between the first database write and the second database write based on a comparison of the first information about the first database write and the second information about the second database write;
generating a double write error comprising the first information about the first database write and the second information about the second database write;
determining a latest database write based on the first information about the first database write and the second information about the second database write;
generating a corrective database transaction based on the latest database write, the corrective database transaction comprising at least one of a first database command for the first database or a second database command for the second database; and
executing the corrective database transaction to correct the double write error.

2. The method of claim 1, further comprising receiving a third indication of a third database write to the second database comprising third information about the third database write, wherein:
the time interval between the first database write and the third database write is less than the predefined threshold time interval; and
the double write error further comprises the third information about the third database write.

3. The method of claim 1, further comprising:
generating a support request comprising third information about the double write error; and
outputting the support request to cause generation of a support ticket, the support ticket comprising the third information about the double write error and fourth information about correction of the double write error.

4. The method of claim 1, wherein the first indication of the first database write is received from a first transaction log and the second indication of the second database write is received from a second transaction log.

5. The method of claim 4, wherein:
according to a specified periodicity:
the first indication is determined by querying the first transaction log at the specified periodicity; and
the second indication is determined by periodically querying the second transaction log at the specified periodicity.

6. The method of claim 4, wherein determining the difference between the first database write and the second database write based on the comparison of the first information about the first database write and the second information about the second database write comprises:

determining, from the first transaction log, a first operation and one or more first affected fields, each first affected field comprising first affected data;

determining, from the second transaction log, a second operation and one or more second affected fields, each second affected field comprising second affected data;

determining that the first operation and the second operation are write operations;

determining that at least one of the one or more first affected fields is included in the one or more second affected fields, wherein:

the at least one of the one or more first affected fields comprises first comparison data; and the one or more second affected fields that include the at least one of the one or more first affected fields comprise second comparison data; and determining that the first comparison data differs from the second comparison data.

7. The method of claim 4, wherein determining the difference between the first database write and the second database write based on the comparison of the first information about the first database write and the second information about the second database write comprises:

determining, from the first transaction log, a first transaction log entry corresponding to the first indication, the first transaction log entry comprising a first timestamp and a first affected field comprising first affected data;

determining, from the second transaction log, a second transaction log entry corresponding to the second indication, the second transaction log entry comprising a second timestamp and a second affected field comprising second affected data;

serializing the first transaction log entry and the second transaction log entry; and comparing the serialized first transaction log entry and the serialized second transaction log entry, comprising:

determining that a first difference between the first timestamp and the second timestamp is less than the predefined threshold time interval;

determining that the first affected field corresponds to as the second affected field; and determining a second difference between the first affected data and the second affected data.

8. The method of claim 4, wherein determining the difference between the first database write and the second database write based on the comparison of the first information about the first database write and the second information about the second database write comprises:

filtering the first transaction log, comprising:

determining, from the first indication, a first timestamp; and selecting, from the first transaction log, one or more first transaction log entries, wherein the one or more first transaction log entries comprise timestamps within a first time range defined by a sum of the first timestamp and the predefined threshold time interval and a difference between the first timestamp and the predefined threshold time interval;

filtering the second transaction log, comprising:

determining, from the second indication, a second timestamp; and selecting, from the second transaction log, one or more second transaction log entries, wherein the one or more second transaction log entries comprise timestamps within a second time range defined by a sum of the second timestamp and the predefined threshold time interval and a difference between the second timestamp and the predefined threshold time interval; and determining the difference between the first database write and the second database write based on the comparison of the first information about the first database write and the second information about the second database write using the one or more first transaction log entries and the one or more second transaction log entries.

9. The method of claim 1, wherein the first information about the first database write comprises transaction metadata, transaction information, and one or more data changes.

10. The method of claim 1, wherein:

the first database and the second database are relational databases;

the corrective database transaction locks the first database and the second database for writing; and the at least one of a first database command for the first database or a second database command comprises one or more SQL statements.

11. A non-transitory computer-readable medium storing instructions that, when executed by one or more processors, cause the one or more processors to perform operations including:

receiving a first indication of a first database write to a first database comprising first information about the first database write;

receiving a second indication of a second database write to a second database comprising second information about the second database write;

determining a time interval between the first database write and the second database write;

responsive to the time interval being less than a predefined threshold time interval, determining a difference between the first database write and the second database write based on a comparison of the first information about the first database write and the second information about the second database write;

generating a double write error comprising the first information about the first database write and the second information about the second database write;

determining a latest database write based on the first information about the first database write and the second information about the second database write;

generating a corrective database transaction based on the latest database write, the corrective database transaction comprising at least one of a first database command for the first database or a second database command for the second database; and executing the corrective database transaction to correct the double write error.

12. The non-transitory computer-readable medium of claim 11, further comprising the operations:

receiving a third indication of a third database write to the second database comprising third information about the third database write;

determining a second difference between the first database write and the third database write; and determining a third difference between the second database write and the third database write, wherein:

the time interval between the first database write and the third database write is less than the predefined threshold time interval; and the double write error further comprises the third information about the third database write.

13. The non-transitory computer-readable medium of claim 11, further comprising the operations:

generating a bug report comprising third information about the double write error; and outputting the bug report to cause generation of a support ticket, comprising the third information about the double write error and fourth information about correction of the double write error.

14. The non-transitory computer-readable medium of claim 11, wherein the first indication of the first database write is received from a first transaction log and the second indication of the second database write is received from a second transaction log.

15. The non-transitory computer-readable medium of claim 11, wherein the first indication of the first database write is received from a first transaction log and the second indication of the second database write is received from a second transaction log, wherein the first and second transaction logs each comprise binary logs.

16. The non-transitory computer-readable medium of claim 11, wherein:

the first database and the second database are document-based databases;

the corrective database transaction locks the first database and the second database for writing; and the at least one of a first database command for the first database or a second database command comprises one or more upsert statements.

17. A system comprising:

one or more processors; and one or more computer-readable storage media storing instructions which, when executed by the one or more processors, cause the one or more processors to perform operations including:

receiving a first indication of a first database write to a first database comprising first information about the first database write;

receiving a second indication of a second database write to a second database comprising second information about the second database write;

determining a time interval between the first database write and the second database write;

responsive to the time interval being less than a predefined threshold time interval, determining a difference between the first database write and the second database write based on a comparison of the first information about the first database write and the second information about the second database write;

generating a double write error comprising the first information about the first database write and the second information about the second database write;

determining a latest database write based on the first information about the first database write and the second information about the second database write;

generating a corrective database transaction based on the latest database write, the corrective database transaction comprising at least one of a first database command for the first database or a second database command for the second database; and executing the corrective database transaction to correct the double write error.

18. The system of claim 17, further comprising the operations:

generating a helpdesk request comprising third information about the double write error; and outputting the helpdesk request to cause generation of a support ticket, comprising the third information about the double write error and fourth information about correction of the double write error.

19. The system of claim 17, wherein the first indication of the first database write is received from a first transaction log and the second indication of the second database write is received from a second transaction log, wherein the first and second transaction logs each comprise binary logs, wherein the binary logs are accessed using a binary log connector.

20. The system of claim 19, wherein determining the difference between the first database write and the second database write based on the comparison of the first information about the first database write and the second information about the second database write comprises the operations:

accessing the first transaction log and the second transaction log using the binary log connector;

determining, from the first transaction log, a first operation and one or more first affected fields, each first affected field comprising first affected data;

determining, from the second transaction log, a second operation and one or more second affected fields, each second affected field comprising second affected data;

determining that the first operation and the second operation are write operations;

determining that at least one of the one or more first affected fields is included in the one or more second affected fields, wherein:

the at least one of the one or more first affected fields comprises first comparison data; and the one or more second affected fields that include the at least one of the one or more first affected fields comprise second comparison data; and determining that the first comparison data differs from the second comparison data.

* * * * *